US010220578B2

(12) United States Patent
Konrad et al.

(10) Patent No.: US 10,220,578 B2
(45) Date of Patent: Mar. 5, 2019

(54) FIBER COMPOSITE MATERIAL COMPONENT, AND METHOD FOR PRODUCING A FIBER COMPOSITE MATERIAL COMPONENT

(71) Applicant: Bayerische Motoren Werke Aktiengesellschaft, Munich (DE)

(72) Inventors: Oleg Konrad, Ergolding (DE); Thomas Hogger, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/454,092

(22) Filed: Mar. 9, 2017

(65) Prior Publication Data

US 2017/0173894 A1    Jun. 22, 2017

Related U.S. Application Data

(63) Continuation of application No. PCT/EP2015/073329, filed on Oct. 9, 2015.

(30) Foreign Application Priority Data

Nov. 11, 2014  (DE) ........................ 10 2014 222 933

(51) Int. Cl.
  *B29C 70/20*   (2006.01)
  *B29C 45/14*   (2006.01)
  (Continued)

(52) U.S. Cl.
  CPC ...... *B29C 70/207* (2013.01); *B29C 45/14065* (2013.01); *B29C 45/14467* (2013.01); (Continued)

(58) Field of Classification Search
  CPC ............ B29C 70/207; B29C 45/14786; B29C 45/14065; B29C 45/1706; B29C 70/24;
  (Continued)

(56) References Cited

U.S. PATENT DOCUMENTS 6,299,246 B1 * 10/2001 Tomka .............. B29C 45/14631
                                                         264/250
2006/0165955 A1 * 7/2006 Ruegg ................... B29C 70/081
                                                         428/113

(Continued)

FOREIGN PATENT DOCUMENTS

DE    31 15 791 A1    8/1982
DE    40 03 207 A1    8/1991
      (Continued)

OTHER PUBLICATIONS

German-language Search Report issued in counterpart German Application No. 10 2014 222 933.2 dated Oct. 29, 2015 with partial English translation (14 pages).

(Continued)

*Primary Examiner* — David Sample
*Assistant Examiner* — Donald M Flores, Jr.
(74) *Attorney, Agent, or Firm* — Crowell & Moring LLP (57) ABSTRACT

A fiber composite material component has fiber bundles and a matrix of thermoplastic and/or thermosetting material. The fiber bundles are arranged such that they form a profile. Bracing structures are arranged between the fiber bundles. At least two fiber bundles are arranged in a skewed manner with respect to one another and at least one cavity is formed in the region of the intersection of the skewed fiber bundles. Furthermore, a method for producing a fiber composite material component having fiber bundles and a matrix of thermoplastic and/or thermosetting material, is provided.

13 Claims, 9 Drawing Sheets

(51) Int. Cl.
*B29C 70/24* (2006.01)
*B29C 45/00* (2006.01)
*B32B 5/12* (2006.01)
*B29C 70/46* (2006.01)
*B62D 29/04* (2006.01)
*B29C 45/17* (2006.01)
*B29L 31/00* (2006.01)
*B29L 24/00* (2006.01)
*B29L 31/30* (2006.01)

(52) U.S. Cl.
CPC .... *B29C 45/14786* (2013.01); *B29C 45/1706* (2013.01); *B29C 70/24* (2013.01); *B29C 70/46* (2013.01); *B62D 29/043* (2013.01); *B29C 2045/14131* (2013.01); *B29C 2045/1707* (2013.01); *B29L 2024/00* (2013.01); *B29L 2031/001* (2013.01); *B29L 2031/30* (2013.01); *B29L 2031/737* (2013.01); *Y10T 428/24058* (2015.01)

(58) Field of Classification Search
CPC .............. B29C 45/14467; B29C 70/46; B29C 2045/14131; B29C 2045/1707; B62D 29/043; Y10T 428/24058; B29L 2031/001; B29L 2031/30; B29L 2024/00; B29L 2031/737
See application file for complete search history.

(56) References Cited

U.S. PATENT DOCUMENTS

| | | | |
|---|---|---|---|
| 2007/0051710 A1 | 3/2007 | Odanaka et al. | |
| 2013/0313862 A1* | 11/2013 | Yamaji | B62D 25/025 296/203.01 |
| 2014/0077412 A1* | 3/2014 | Taniguchi | B29C 70/42 264/257 |
| 2014/0079482 A1 | 3/2014 | Sohl | |
| 2014/0079908 A1* | 3/2014 | Kato | B32B 3/06 428/140 |
| 2014/0178631 A1* | 6/2014 | Taniguchi | C08J 5/04 428/130 |
| 2014/0339036 A1* | 11/2014 | Arai | F16F 7/124 188/371 |
| 2015/0031257 A1* | 1/2015 | Ootsubo | D04H 1/72 442/60 |
| 2015/0224737 A1* | 8/2015 | Kamiya | B29C 70/24 428/114 |
| 2015/0246505 A1* | 9/2015 | Yasue | B29C 70/24 428/102 |

FOREIGN PATENT DOCUMENTS

| | | |
|---|---|---|
| DE | 10 2006 040 784 A1 | 4/2007 |
| DE | 10 2011 075 688 A1 | 11/2012 |
| DE | 10 2013 219 820 A1 | 4/2015 |
| FR | 2 931 785 A1 | 12/2009 |
| GB | 2 074 117 A | 10/1981 |
| JP | 4-259530 A | 9/1992 |

OTHER PUBLICATIONS

International Search Report (PCT/ISA/210) issued in PCT Application No. PCT/EP2015/073329 dated Dec. 17, 2015 with English translation (5 pages).

German-language Written Opinion (PCT/ISA/237) issued in PCT Application No. PCT/EP2015/073329 dated Dec. 17, 2015 (5 pages).

Chinese-language Office Action issued in counterpart Chinese Application No. 201580045950.9 dated May 25, 2018 with English translation (twelve (12) pages).

* cited by examiner

FIBER COMPOSITE MATERIAL COMPONENT, AND METHOD FOR PRODUCING A FIBER COMPOSITE MATERIAL COMPONENT

CROSS REFERENCE TO RELATED APPLICATIONS

This application is a continuation of PCT International Application No. PCT/EP2015/073329, filed Oct. 9, 2015, which claims priority under 35 U.S.C. § 119 from German Patent Application No. 10 2014 222 933.2, filed Nov. 11, 2014, the entire disclosures of which are herein expressly incorporated by reference.

BACKGROUND AND SUMMARY OF THE INVENTION

The present invention concerns a fiber composite material component, and a method for manufacturing a fiber composite material component.

It is known from the prior art how to arrange fiber bundles and/or scrims and/or textiles pre-impregnated with thermoplastic material in a sheet-like fashion in order to construct components. It is also known how to inject thermoplastic material with and without fibers around individual points of fiber-reinforced plastic. These methods serve to reinforce points with greater stress, especially points where force is applied, and thus improve the stability of the component.

Furthermore, it is known how to make components by injection molding. In this process, a textile fiber material (such as scrims, textiles, knitted fabrics, bundles or the like) is inserted in a mold and then extrusion coated with thermoplastic material with and without fibers. The aforementioned methods are used to make shells or hollow components with enclosed surfaces or the like.

DE 10 2006 040 784 A1, for example, discloses an injection molding method for fiber-reinforced motor vehicle parts made of fiber-reinforced thermoplastics by injection molding.

However, the methods known in the prior art have drawbacks in that only two-dimensional or sheet-like fiber arrangements of the endless fibers are provided. At the same time, one finds himself here at the limits of lightweight construction and at the limits of what can be accomplished with a load-optimized fiber layer. Moreover, a large material input is necessary and the waste may be sizeable.

It would therefore be desirable to be able to construct lighter and more load-optimized items, with less material input and less waste. Furthermore, material clusters should be avoided as much as possible.

Therefore, it is the object of the present invention to provide a fiber composite material component and a method for manufacturing a fiber composite material component of the above-mentioned kind, especially by enabling lighter construction, more load-optimized fiber layers, less input of material and also less waste.

This and other objects are achieved in accordance with embodiments of the invention. According to an exemplary embodiment, a fiber composite material component has fiber bundles and a matrix of thermoplastic and/or thermosetting material. The fiber bundles are arranged so as to form a profile and bracing structures are arranged between the fiber bundles. At least two fiber bundles are arranged skewed with respect to one another. The run of at least two fiber bundles intersects one another and at least one cavity is formed in the region of the intersection of the skewed fiber bundles.

The invention is based on the basic notion of avoiding material clusters by means of at least one cavity in the region of the intersection of the two skewed fiber bundles. The use of skewed fiber bundles makes it possible to provide the structure of the fiber composite material component with nodes or intersections. These nodes or intersections stiffen the profile of the fiber composite material component. In this way, a very rigid fiber composite material component can be produced with relatively low weight, which can be used, for example, as a chassis component. The fiber composite material component according to the invention has the benefit, in particular, of enabling an overall lighter construction than is known in the prior art, and furthermore a three-dimensional arrangement of endless fibers is made possible and a more load-optimized fiber layer can be provided. In this way, less material input and less waste are also advantageously achieved.

The fiber composite material component can comprise at least two or more profiles. Each profile has at least two fiber bundles arranged skewed and intersecting with respect to each other, and at least one cavity is formed in the region of the intersection of the skewed fiber bundles.

The skewed and intersecting fiber bundles can be arranged perpendicular to each other. In this way, a stable truss-like structure can be provided simply in the profile.

Basically, it is also possible for the skewed and intersecting fiber bundles to subtend an acute angle.

Each fiber bundle together with the matrix can form a brace in the profile, which is part of the profile. Thanks to the formation of braces, it becomes possible advantageously to divert the loads in the profile and achieve a relatively high stability despite the lightweight construction. The braces can especially absorb tensile stresses and/or flexural stresses.

At least two skewed and intersecting fiber bundles can be embedded in the matrix in the region of their intersection such that the braces formed by the two skewed fiber bundles each have a broadening area in this region. Thanks to the broadening area, construction elements can be fastened in this region, which might otherwise influence or impair the stability of the brace.

The cavity can be formed or arranged in the broadening area.

At least one opening or hole can be provided in the region of the broadening area. Thanks to the broadening area, the stability of the brace and thus of the profile is nonetheless equally preserved or not diminished significantly or at all.

The opening can be connected to the cavity. This provides the benefit that the cavity becomes accessible through the opening and, for example, the opening and the cavity can be used to receive a fastening element such as a bolt or a screw. It is contemplated for several openings to be provided and connected to the cavity. These openings, for example, can be used to blow out melt from the cavity in the case when the cavity is formed by internal-pressure injection molding (see below).

Moreover, it is contemplated that at least one fiber bundle is a UD fiber bundle comprising several unidirectionally arranged fibers.

UD fiber bundles are bundles comprising several unidirectionally arranged fibers, i.e., fiber bundles not having any twisting of the fibers. The fibers can be carbon fibers, for example. It is also contemplated for the fibers to be glass fibers. However, basically fibers made of any other suitable material can also be chosen.

Furthermore, it can be provided that at least one fiber bundle consists exclusively of unidirectionally arranged fibers in the direction of the run of the fiber bundles. This enables a simple construction of the fiber composite material component.

Moreover, it is contemplated that at least one fiber bundle comprises first unidirectionally arranged fibers in the direction of the run of the fiber bundles and second unidirectionally arranged fibers with which the first fibers are interwoven. In this way, the stability of the fiber bundle can be improved.

It is possible for at least one fiber bundle to be arranged at one edge of the profile of the fiber composite material component and/or for the fiber bundles and the bracing structures to form a three-dimensional profile.

It is contemplated to provide at least three fiber bundles and/or for the fiber bundles to be arranged three-dimensionally.

The fiber composite material component can be a chassis component or the like. For example, it is contemplated for the fiber composite material component to be a roof cross connection element, such as the cowl (i.e., the roof cross connection in the region between the two A-columns of the motor vehicle) of a vehicle.

By means of the fiber bundles with endless fibers, it is possible to provide three-dimensional arrangements. Thanks to the corresponding arrangement with bracing structures, rigid and stable profiles can be provided, so that significantly lighter construction is possible. Consequently, a very great lightweight potential is provided and made possible. Furthermore, any desired profile geometries can be created, which is of particular advantage in the case of components with a large portion of freeform surfaces.

Furthermore, it is possible that the fibers are arranged such that they absorb or can absorb flexural stresses and/or tensile stresses and/or compressive stresses. This provides the benefit of load-optimized construction being possible, wherein in particular fiber composite material components can be provided which are configured to be load-optimized for the flexural stresses and/or tensile stresses and/or compressive stresses which are applied to them.

Moreover, it is contemplated for the bracing structures to be arranged such that they transmit and/or absorb and/or can absorb torsional forces and/or shear forces. This provides the benefit that torsional forces or shear forces which occur in addition to the flexural stresses, tensile stresses, or compressive stresses are absorbed not by the fiber bundles, but by the bracing structures provided for this purpose. This increases the overall stability of the fiber composite material component, since individual elements are provided for the particular loads occurring, namely, for example, the fiber bundles for the flexural stress and/or tensile stress and/or compressive stress and the bracing structures for the torsional forces and/or shear forces. This accomplishes a very stable structure, yet at the same time the weight need not be significantly increased.

Furthermore, it is possible for at least one fiber bundle to have at least one exposed segment, where no bracing structures are arranged, wherein preferably it is provided that the fiber bundles have exposed segments at regular or irregular intervals and/or that the exposed segment is at least partly curved or straight. The exposed segments make it possible to tension the fiber bundles directly in the die during the manufacture. This prevents the fiber bundle from being shifted during the injection of the thermoplastic and/or thermosetting material, which is undesirable. This increases the manufacturing precision of the fiber composite material component. At the same time, weight is also spared, because less thermoplastic and/or thermosetting material is used and only mass of material that is necessary is used. The fact that the fiber bundles have exposed segments at regular or irregular intervals is furthermore advantageous because the fiber bundles can be well secured in the die at these points.

Moreover, it can be provided that the bracing structures are formed from shear surfaces and/or that the bracing structures are formed by injecting of thermoplastic and/or thermosetting material or by fiber bundles. This provides the benefit that lightweight elements, which can easily be produced, can be used as bracing structures. This is economical and at the same time it allows a lightweight structure. The thermoplastic and/or thermosetting material can also be fiber-reinforced.

It is further contemplated that the fiber bundles are offset in the mold-stripping direction such that they can be removed from the molding die without a pusher. This simplifies the manufacturing and furthermore leads to a lowering of the manufacturing times, since the removal from the molding die is facilitated. Thanks to the elimination of the pusher, substantial cost savings are possible, because the required die is less complex and can be made more cheaply.

Furthermore, it is possible to provide the fiber bundle with straight regions and/or curved regions. This provides the benefit that the fiber bundles can approximately follow any given curve. It is contemplated that the bundles are designed so as to consist of straight regions and, for example, short curved regions. The fiber bundles, for example, do not need to be extrusion coated in the short curved regions in order to be able to be fixed in the die at this point. This allows an especially simple manufacturing of the profile. Furthermore, the manufacturing is simplified because no injecting is needed in the curved regions. Moreover, it is advantageous that such a bundling of straight and curved regions can follow approximately any desired curve, so that in this way essentially any given freeform surface can be created.

Furthermore, the present invention concerns a method for manufacturing a fiber composite material component. Accordingly, in a method for manufacturing a fiber composite material component with fiber bundles and with a matrix of thermoplastic and/or thermosetting material, one proceeds in such a way that the fiber bundles are arranged so as to form a profile, wherein bracing structures are arranged between the fiber bundles, wherein at least two fiber bundles are arranged skewed with respect to one another, and wherein at least one cavity is formed in the region of the intersection of the skewed fiber bundles.

This provides the benefit according to the invention of an overall more lightweight construction than in the prior art being possible, and furthermore a three-dimensional arrangement of endless fibers is made possible and a more load-optimized fiber layer can be provided. Furthermore, this achieves that advantageously the material input can be decreased and there is less waste. The formation of the cavity can prevent material clustering.

The cavity can be formed by internal-pressure injection molding. Internal-pressure injection molding, also known as Fluid Injection Technique (FIT), is a specialized form of injection molding for the manufacture of hollow workpieces. After one traditional injection molding process step or after a defined partial filling of the casting mold, a temporary filler (water or inert gas, usually nitrogen) is injected into a partly-filled mold so that it acts as an internal molding piece (core). Thanks to the displacement of the melt from the middle, on the one hand, a cavity grows and on the other hand, the melt is forced onto or into the outer casting mold. After hardening of the melt, the fluid again escapes. The benefit of this technique is that an internal molding piece is not needed. Moreover, structures can be formed of such a kind that the removal of an internal molding piece or core would be very difficult.

The internal-pressure injection molding can be a gas internal-pressure injection molding. In gas internal-pressure injection molding, gas displaces the melt located in the injection mold and accomplishes the rest of the filling with pressures up to a maximum of 300 bar. The injecting can be done, for example, through the machine nozzle and thus through the gating system or through a separate injection needle directly into the molded part in the cavity. Another variant is the complete filling of the cavity with melt and subsequent blowing of melt into a secondary cavity or blowing back into the worm cylinder of the injection molding machine. Gas internal-pressure injection molding can be used especially advantageously when it is necessary to compensate for shrinkage and avoid mass clustering. It is also possible to realize very small channel cross sections. Gas internal-pressure injection molding is also used with preference when water cannot be removed from the component or the size of the injector is a critical factor.

The internal-pressure injection molding can be an internal-pressure injection molding by means of fluid injection technique. In particular, it may be a water internal-pressure injection molding. Here as well, similar to the above-described gas internal-pressure injection molding, the melt present in the injection mold is displaced by the fluid and the fluid accomplishes the rest of the filling.

Benefits resulting from the use of fluids such as water are the substantial reduction of the cycle time. This has to do, among other things, with the greater thermal capacity of fluids or liquids such as water as compared to gases. Furthermore, an improvement of the surface structure is also possible. Liquids like water automatically come into play when the cross sections and the channel lengths become too large for the gas injection technique, depending on the material, and when a smooth, enclosed surface is required in regions without fiber reinforcement. However, in general, besides the slight warpage, the likewise smaller achievable residual wall thickness also plays a central role. In terms of operation economy, the substantially shorter cycle times and the lack of gas expenses when water is used stand in the forefront. For large lot sizes, this can lead to a reduction in capital expenses of up to 50% (production lines cut in half due to boosted efficiency of each individual line).

Furthermore, it can be provided that the fiber bundles used for the manufacturing process are UD fiber bundles comprising several unidirectionally arranged fibers.

UD fiber bundles which can be used in the method are bundles comprising several unidirectionally arranged fibers, i.e., for example, fiber bundles which also have no twisting of the fibers. The fibers can be, for example, carbon fibers. It is also contemplated for the fibers to be glass fibers. However, basically fibers made of any other suitable material can also be chosen.

Furthermore, it can be provided that at least one fiber bundle consists exclusively of unidirectionally arranged fibers in the direction of the run of the fiber bundles. This enables an easy construction of the fiber composite material component.

Moreover, it is contemplated that at least one fiber bundle comprises first unidirectionally arranged fibers in the direction of the run of the fiber bundles and second unidirectionally arranged fibers with which the first fibers are interwoven. In this way, the stability of the fiber bundle can be improved.

It is contemplated that at least three fiber bundles are provided and/or that the fiber bundles are three-dimensionally arranged.

The fiber composite material component can be a chassis component or the like.

By means of the fiber bundles with endless fibers, three-dimensional arrangements can be provided. Thanks to the corresponding arrangement with bracing structures, rigid and stable profiles can be provided, so that significantly lighter construction is possible. Consequently, a very great lightweight potential is provided and made possible. Furthermore, any desired profile geometries can be created, which is of particular advantage in the case of components with a large portion of freeform surfaces.

The features and benefits described above in connection with the fiber composite material component according to the invention and the exemplary embodiments can be provided alone or in combination, likewise for the method according to the invention for the manufacture of a fiber composite material component or the exemplary embodiments of the method described below.

Furthermore, it can be provided that at least one fiber bundle is or has been arranged at one edge of the profile of the fiber composite material component and/or that the fiber bundles and the bracing structures form a three-dimensional profile.

Furthermore, it can be provided that the fibers are or have been arranged such that they absorb or can absorb flexural stresses and/or tensile stresses and/or compressive stresses. Furthermore, it can be provided that the bracing structures are or have been arranged such that they transmit and/or absorb and/or can transmit and/or absorb torsional forces and/or shear forces. As already described above, this facilitates a load-optimized design of the fiber composite material component and supports the effort for the most lightweight construction.

Moreover, it is possible for at least one fiber bundle to have at least one exposed segment, where no bracing structures are arranged, wherein preferably it is provided that the fiber bundles have exposed segments at regular or irregular intervals and/or that the exposed segment is at least partly curved or straight. As already explained in detail above, this provides the benefit that essentially any free form surface can be created. Moreover, the shaping precision can be improved, because the fiber bundles can be fixed directly in the die by corresponding recesses in the die, so that a slippage of the fiber bundles can be reliably prevented.

Moreover, it can be provided that the fiber bundles are used dry. In this way, for example, the inserting into the die can be facilitated. Applications are also contemplated such that it is not desirable to employ pre-impregnated fiber bundles.

Furthermore, however, it is likewise possible to employ the fiber bundles pre-impregnated. In this way, for example, it is possible to achieve a preliminary cross-linking and a better purchase and bonding with the surrounding material, if this should be required.

Furthermore, it is contemplated that the fiber bundles are arranged offset in the mold-stripping direction, such that they can be removed from the molding die without a pusher. This simplifies the tooling of the molding die and can be realized substantially more cost-effectively.

Furthermore, it is possible for the bracing structures to be formed of braces and/or shear surfaces and/or for the bracing structures to be formed by injection of thermoplastic and/or thermosetting material or by fiber bundles. This provides the benefit that lightweight elements, which can be easily created, can be used as bracing structures. This is economical and at the same time, it enables a lightweight structure.

Furthermore, it is possible to provide fiber bundles with straight regions and/or curved regions. This provides the benefit that the fiber bundles can approximately follow any given curve. It is contemplated that the bundles are designed so as to consist of straight regions and, for example, short curved regions. The fiber bundles, for example, do not need to be extrusion coated in the short curved regions in order to be able to be fixed in the die at this point. This provides an especially simple manufacturing of the profile. Furthermore, the manufacturing is simplified because no injecting is needed in the curved regions. Moreover, it is advantageous that such a bundling of straight and curved regions can follow approximately any desired curve, so that in this way essentially any given freeform surface can be created.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
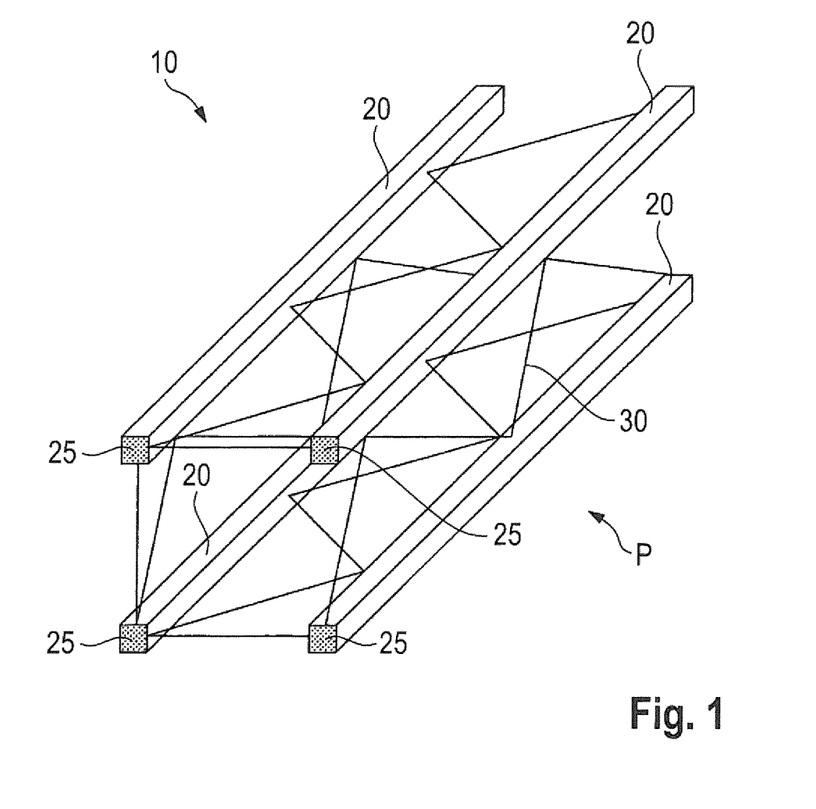
FIG. 1 is a perspective view of a basic skeleton of a fiber composite material component according to an exemplary embodiment of the invention.

FIG. 1 shows a basic skeleton of a fiber composite material component 10 according to an exemplary embodiment of the invention without surrounding material, which is obtained by a method according to the invention for manufacturing the fiber composite material component 10.

In a manufacturing method for producing the fiber composite material component 10 shown in FIG. 1, fiber bundles 20 are, first of all, arranged three-dimensionally according to a profile P.

The profile P here has four substantially parallel arranged fiber bundles 20 with fibers 25. Between the fiber bundles 20 there are provided several bracing structures 30.

Figure 2:
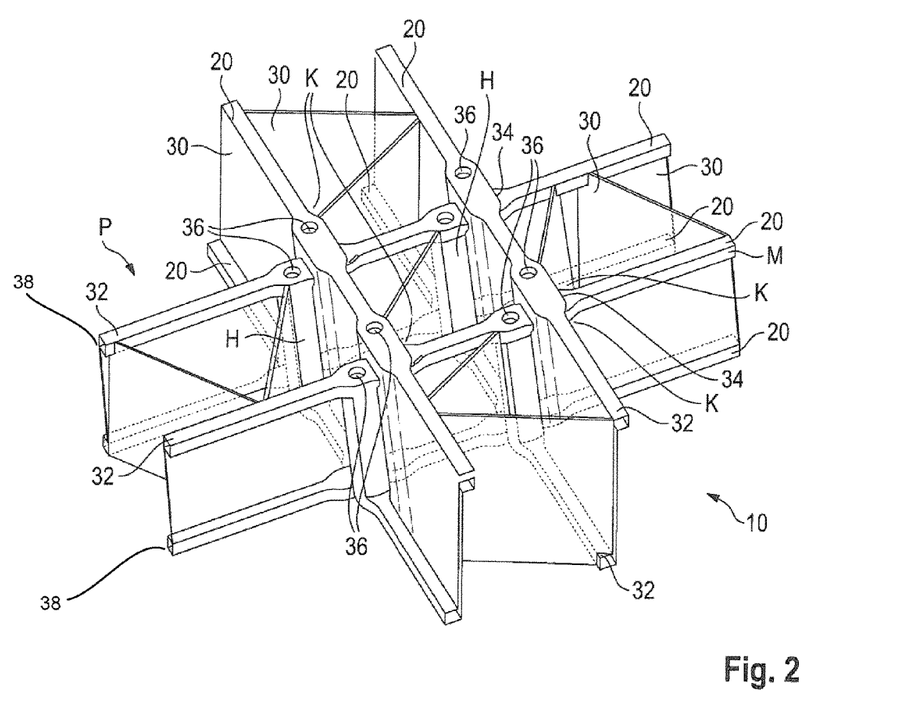
FIG. 2 is a perspective view of the fiber composite material component according to an exemplary embodiment of the invention.

By means of a matrix M of thermoplastic and/or thermosetting material, the fiber bundles 20 and the bracing structures 30 are joined together (see FIG. 2 for example). The bracing structures 30 can here be part of the matrix M.

The finished fiber composite material component 10 thus comprises fiber bundles 20 and a matrix M. The fiber bundles 20 are arranged such that they form a profile P, while the bracing structures 30 is arranged between the fiber bundles 20.

The fiber bundles 20 here are unidirectional (UD) fiber bundles and include several unidirectionally arranged fibers 25.

It is possible for the fiber bundles 20 to consist exclusively of unidirectionally arranged fibers in the direction of the run of the fiber bundles.

Alternatively, however, it is also contemplated for the fiber bundles 20 to have first unidirectionally arranged fibers in the direction of the run of the fiber bundles 20 and second unidirectionally arranged fibers with which the first fibers are interwoven.

In this context, it can also be provided that at least one fiber bundle consists exclusively of unidirectionally arranged fibers in the direction of the run of the fiber bundles 20 and at least one additional fiber bundle has first unidirectionally arranged fibers in the direction of the run of the fiber bundles 20 and second unidirectionally arranged fibers with which the first fibers are interwoven.

FIG. 2 shows a top view of a fiber composite material component 10 according to the invention, which has been produced by a method according to the invention for manufacturing the fiber composite material component 10 and which has the above-described structural and functional features.

Figure 3:
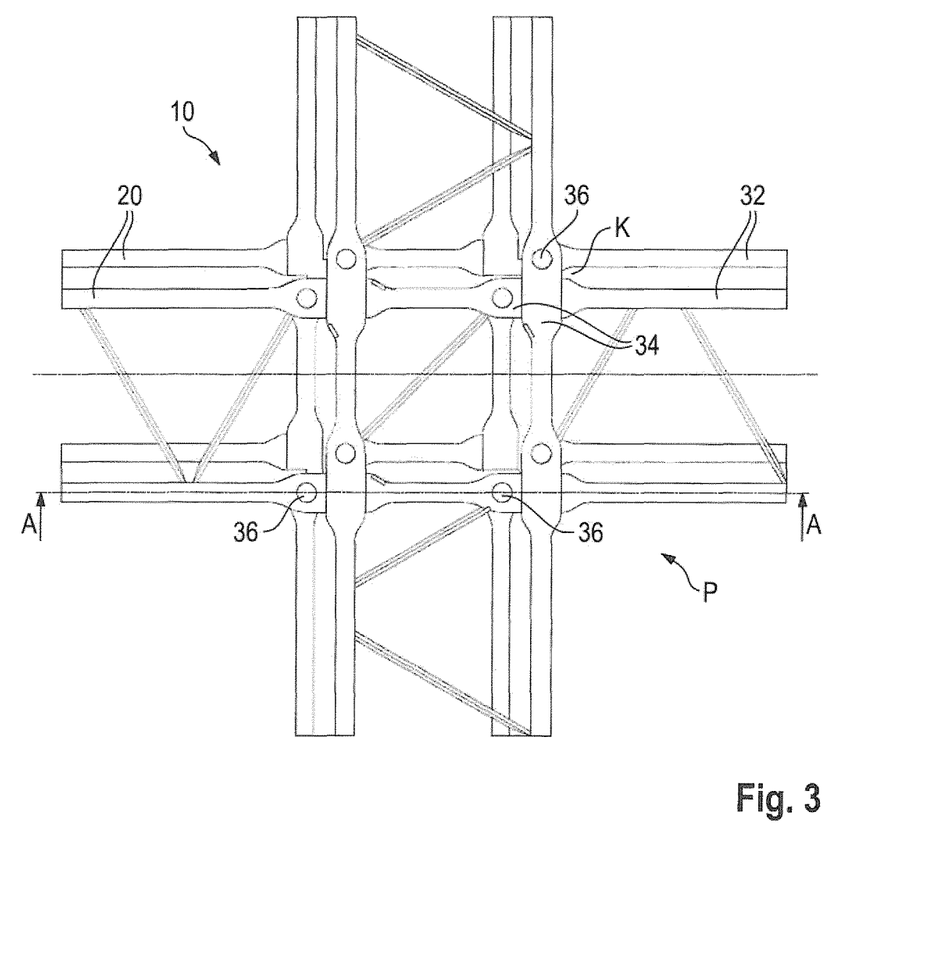
FIG. 3 is a top view of the fiber composite material component shown in FIG. 2.

FIG. 3 shows a top view of the fiber composite material component 10 of FIG. 2.

Figure 4:
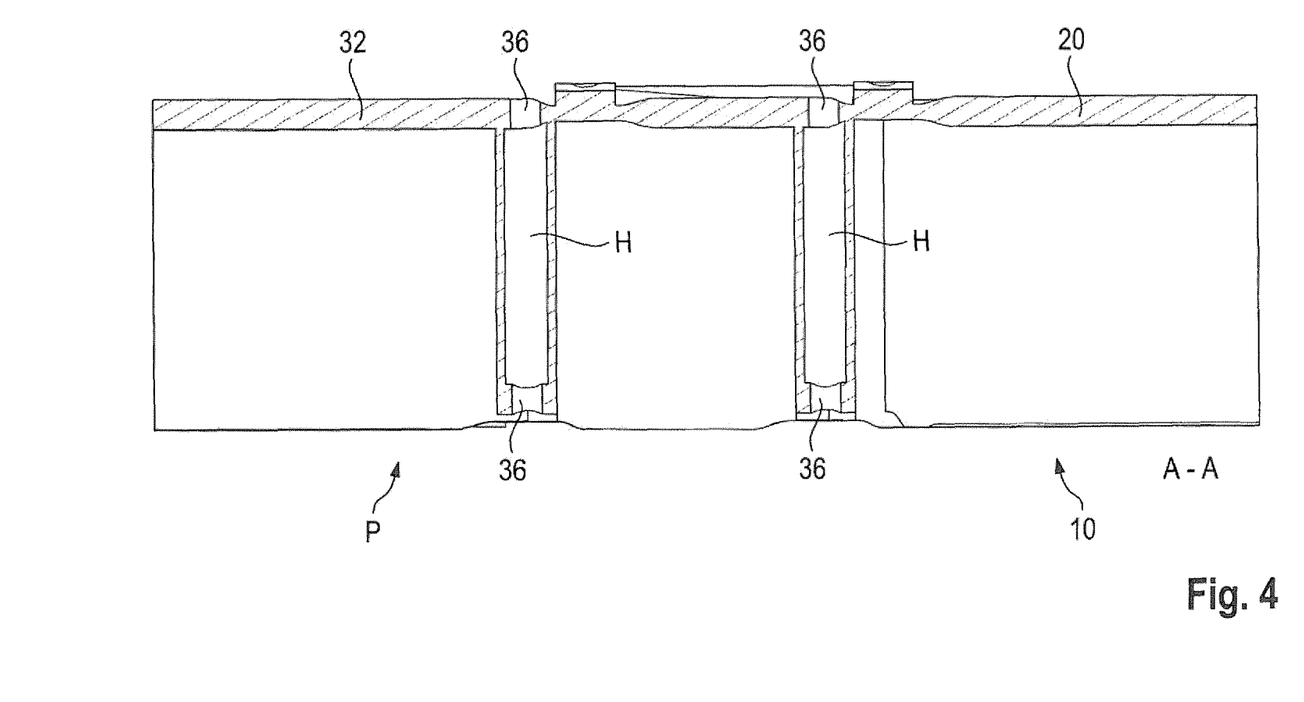
FIG. 4 is a sectional view of the fiber composite material component shown in FIG. 2 and FIG. 3 along section A-A of FIG. 3.

FIG. 4 shows a sectional view of the fiber composite material component 10 shown in FIG. 2 and FIG. 3, taken along section A-A of FIG. 3.

In the profile P, several fiber bundles 20 are arranged skewed with respect to one another.

The skewed fiber bundles 20 are disposed perpendicular to each other.

Each one of these fiber bundles 20 forms, together with the matrix M in the profile P, a brace 32, which is part of the profile P.

In the region of an intersection K of every two skewed fiber bundles 20 or in the region of an intersection K of the respective braces 32, there is formed at least one cavity H.

The braces 32 each has a broadening area 34 in the region of their intersection K.

In the region of the broadening area 34, at least one opening 36 is provided. The opening 36 is connected to the cavity H, as shown in FIG. 4.

On either of the longitudinal ends of the cavity H there is provided an opening 36.

The profile P shown in FIG. 2 can be part of a larger profile, or already be its own part.

The profile P has two frame-like lattices 38 each and each of them is formed from four skewed braces 32, as shown in FIG. 2.

The lattices 38 are here substantially identical in construction. They are disposed at two opposite sides of the profile P and tighten the profile P or serve as a skeleton for the profile P.

In each lattice 38, two parallel braces 32 are provided in a first plane and two other parallel braces 32 are provided in a plane spaced apart from the plane.

The parallel braces 32 of the first plane intersect, and are arranged skewed against and perpendicular to the parallel braces 32 of the second plane. A cavity H is formed in the region of each intersection K.

The two lattices 38 are joined together by several bracing structures 30.

The function and manufacture of the fiber composite material component 10 shown in FIGS. 1-3 are described below.

The fiber bundles 20, as shown in FIGS. 1-3, are arranged at least at the outer edges of the profile P of the fiber composite material component 10 and between the fiber bundles 20 there are provided bracing structures 30, such as ribs and shear surfaces, and arranged so that a truss-like profile structure can be produced. The fiber bundles 20 and the bracing structures 30 are extrusion coated thermoplastic or thermosetting material, or the bracing structures 30 are created by being injected onto the fiber bundles 20.

The forces are then transmitted by the fibers 25, wherein the thermoplastic or thermosetting material provides the connection between the fiber bundles 20. Thanks to the three-dimensional arrangement, profiles P with good stiffness and good stability can be produced at minimal weight. Thanks to the free arrangement of the fiber bundles 20 in the space, any given profile shapes are made possible, which can be used, for example, for B-columns, load-bearing structures, window frames, and so on.

The fibers 25 can be arranged such that they absorb flexural stresses and/or tensile stresses and/or compressive stresses.

The bracing structures 30 are arranged such that they can transmit and/or absorb torsional forces and/or shear forces.

It is contemplated to use the fiber bundles 20 in the dry state. However, it is also contemplated to use them pre-impregnated.

The bracing structures 30 can be formed from braces or shear surfaces and it is further contemplated for the bracing structures to be formed by injecting of thermoplastic or thermosetting material onto them, or by fiber bundles 20.

It is contemplated to arrange the fiber bundles 20 offset in the mold-stripping direction, so that they can be removed from the molding die without a pusher.

Furthermore, it can be provided that the fiber bundles 20 are designed so as to consist of straight regions and short curved regions and thus can follow approximately any given curve.

The cavity H is formed by internal-pressure injection molding during the manufacturing of the fiber composite material component 10 according to the invention.

The internal-pressure injection molding can be a gas internal-pressure injection molding or an internal-pressure injection molding using fluid injection technique, especially a water internal-pressure injection molding.

The method according to the invention and the fiber composite material component 10 according to the invention make it possible to accomplish three-dimensional arrangements of the UD fiber bundles 20 with endless fibers 25, enabling practically any given configuration. One can achieve rigid and stable profiles P which furthermore can be much lighter than comparable known profiles. Thus, a very good lightweight construction is possible. Furthermore, any desired profile geometries or any desired component configurations can be created and a lower material requirement is achieved. In particular, there is little or no waste.

The cavities H serve to prevent material clustering. Thanks to internal-pressure injection molding, the use of pushers or cores is unnecessary and the manufacturing is simplified.

The skeletal structure of the profile P advantageously enables a high torsional strength of the fiber composite material component 10.

Figure 5:
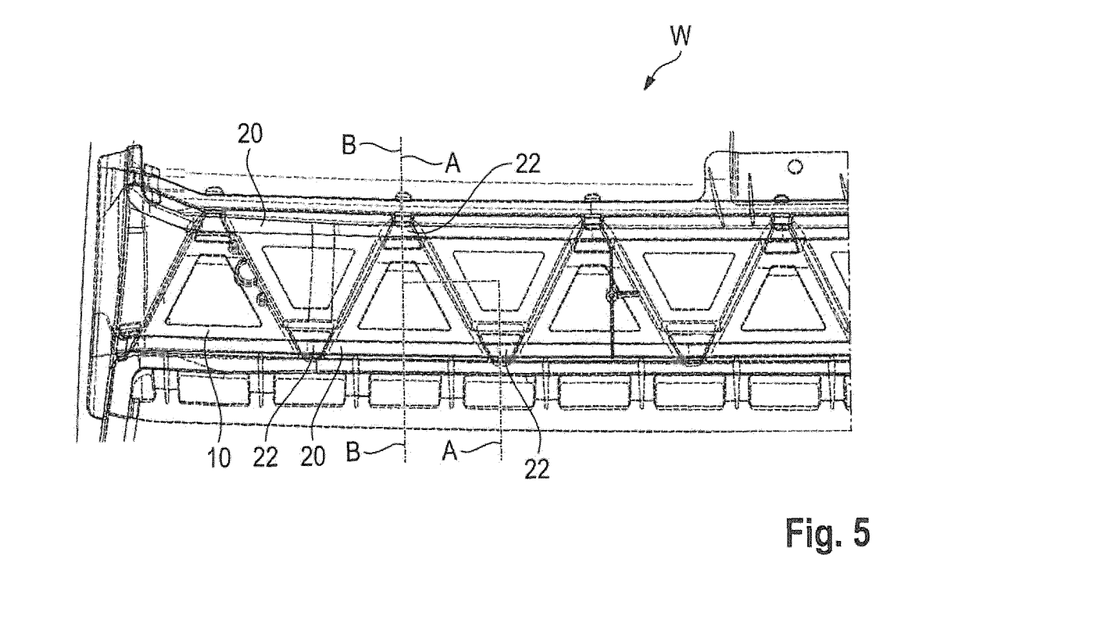
FIG. 5 is a top view of a die for manufacturing a fiber composite material component in accordance with an exemplary aspect of the invention.
Figure 6:
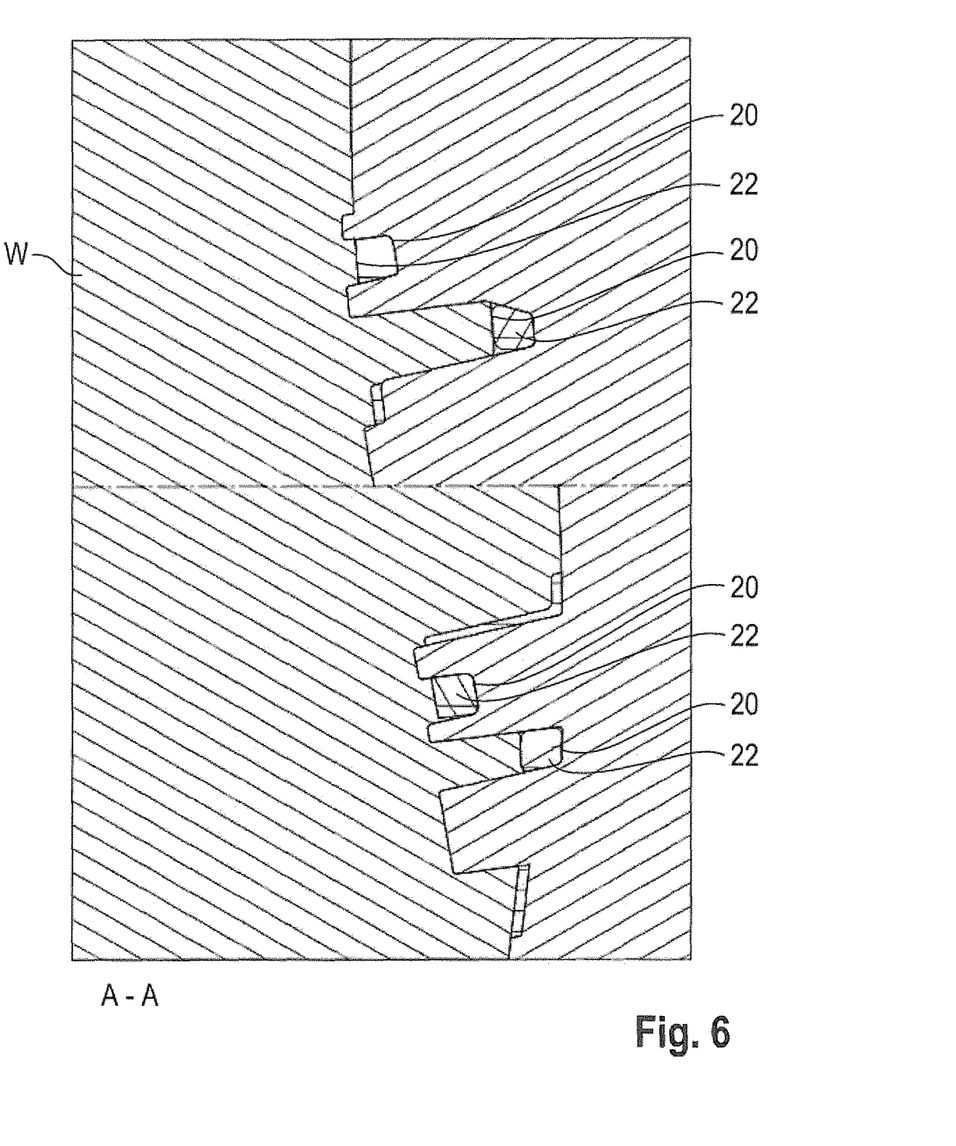
FIG. 6 is a sectional view along section A-A of FIG. 5.

FIG. 5 shows a top view of the die W for manufacturing a fiber composite material component 10 according to the invention, particularly, a roof cross member for a motor vehicle, namely a cowl. FIG. 6 is a sectional view along section A-A of FIG. 5 and FIG. 7 is a sectional view along section B-B of FIG. 5.

The fiber composite material component 10 according to FIG. 5 has all of the features illustrated and described above in connection with FIG. 1. Here again, fiber bundles 20 are arranged three-dimensionally as a profile P and bracing structures 30 are arranged between the fiber bundles 20, joining the fiber bundles 20 to each other. The fiber bundles 20 can be UD fiber bundles as described above in connection with FIG. 1.

Figure 7:
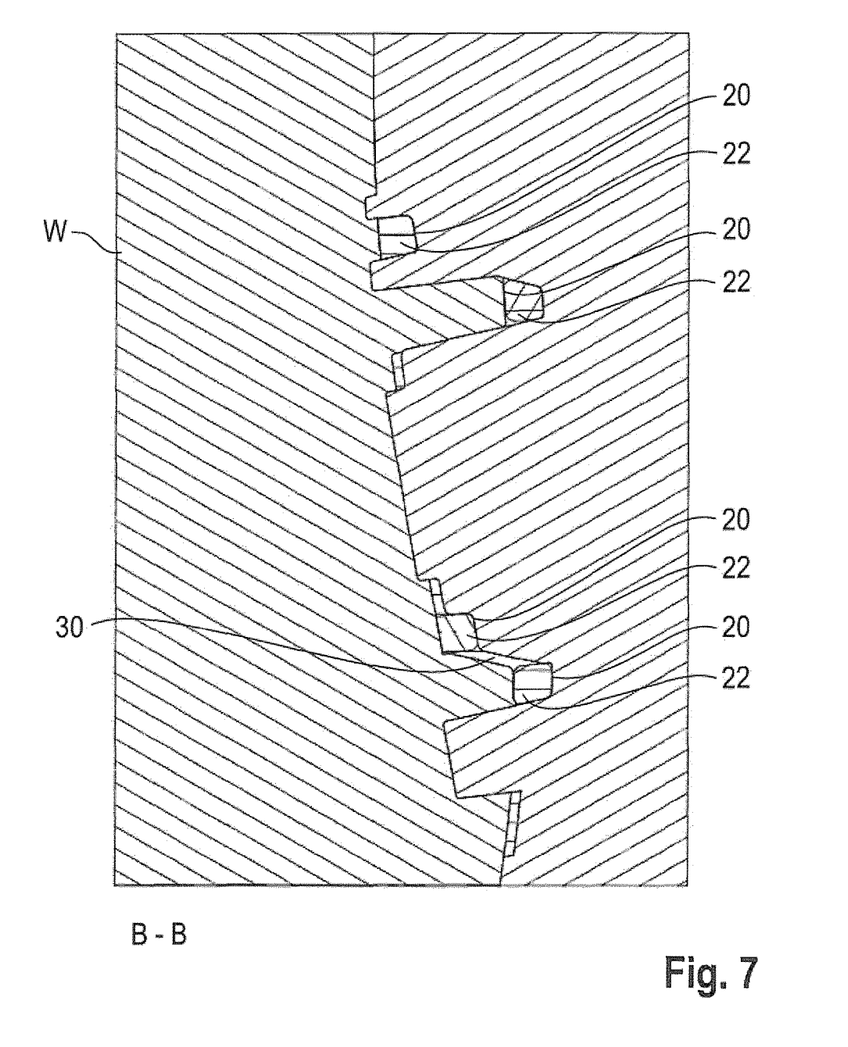
FIG. 7 is a sectional view along section B-B of FIG. 5.

As can be seen from FIGS. 5-7, exposed segments 22 are provided at regular intervals where no bracing structures 30 are arranged. In these exposed segments 22, the fiber bundles 20 are placed directly in the die W, as is shown in FIGS. 6-7. Consequently, the fiber bundles 20 upon injecting of thermoplastic or thermosetting material are fixed at this point in the die and do not move out from the mold. A good shaping precision is therefore possible.

The fiber bundles 20 can have exposed segments 22 at regular or irregular intervals. Basically, the exposed segment 22 can be at least partially curved or straight.

Figure 8:
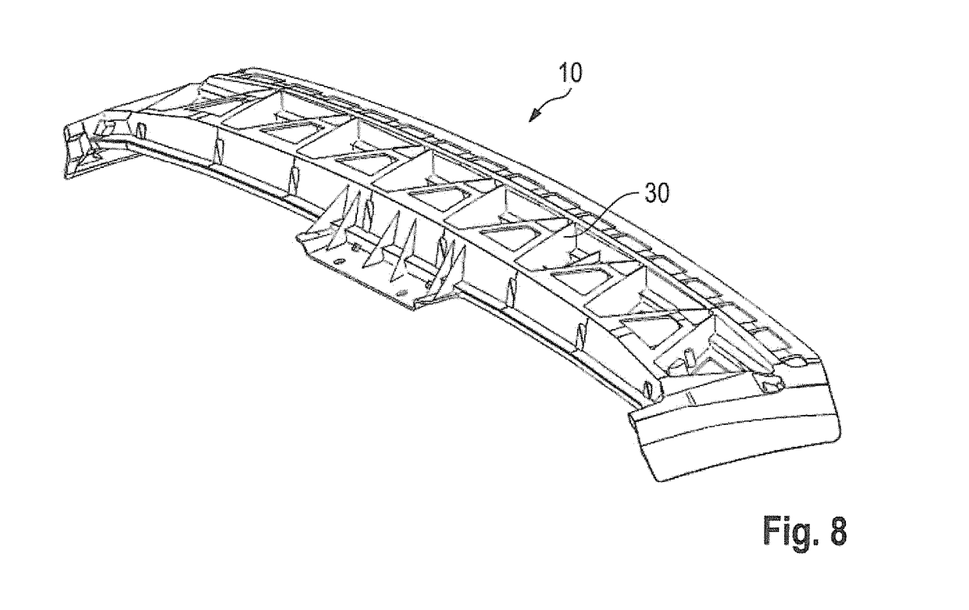
FIG. 8 is a perspective view of the fiber composite material component according to an exemplary embodiment of the invention.
Figure 9:
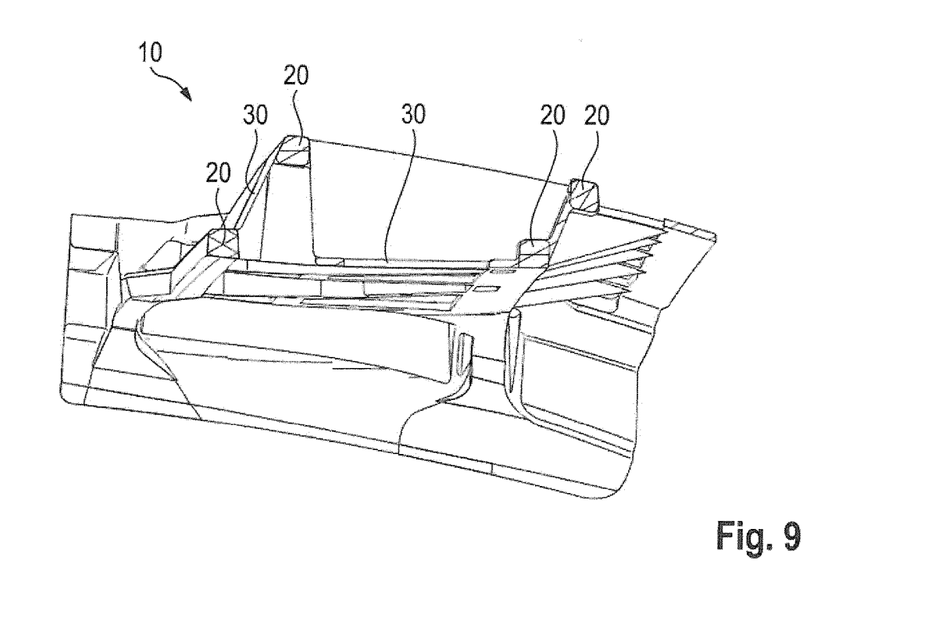
FIG. 9 is a further perspective view of the fiber composite material component according to an exemplary embodiment of the invention.
Figure 10:
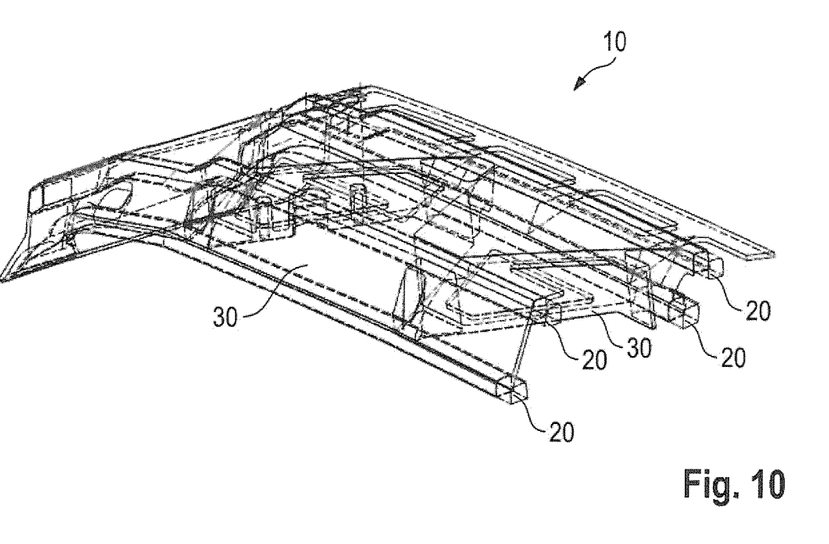
FIG. 10 is a further perspective view of the fiber composite material component according to an exemplary embodiment of the invention.

FIG. 8 shows a perspective view of the fiber composite material component 10 according to the invention, as illustrated in FIGS. 5 to 7. FIGS. 9-10 are broken views of the fiber composite material component 10 shown in FIG. 8.

The fiber bundles 20 are arranged respectively in the edge regions of the fiber composite material component 10. In this way, the fibers of the fiber bundles 20 can absorb flexural stresses, tensile stresses and compressive stresses.

On the other hand, the bracing structures 30 are arranged so that they can transmit and/or absorb torsional forces and/or shear forces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fiber composite material component, comprising:
    fiber bundles arranged so as to form a profile;
    a matrix of thermoplastic and/or thermosetting material; and
    bracing structures arranged between the fiber bundles, wherein
    at least two of the fiber bundles are arranged skewed with respect to one another, and
    a cavity is formed within a wall of at least one of the bracing structures in a region of an intersection of the skewed fiber bundles.

2. The fiber composite material component according to claim 1, wherein
    the fiber bundles are arranged so as to form two or more profiles,
    each of the two or more profiles has at least two fiber bundles arranged skewed and intersecting with respect to each other, and
    the cavity is formed in the region of the intersection of the skewed fiber bundles.

3. The fiber composite material component according to claim 1, wherein each of the fiber bundles together with the matrix forms a brace in the profile, and the brace is part of the profile.

4. The fiber composite material component according to claim 2, wherein
- each of the fiber bundles together with the matrix forms a brace in the each of the two or more profiles, and the brace is part of the profile, and
- the at least two skewed and intersecting fiber bundles are embedded in the matrix in the region of the intersection such that each brace formed by the two skewed fiber bundles has a broadening area in the region of the intersection.

5. The fiber composite material component according to claim 4, wherein at least one opening is provided in a region of the broadening area and is connected to the cavity.

6. The fiber composite material component according to claim 1, wherein at least one of the fiber bundles is a unidirectional (UD) fiber bundle comprising a plurality of unidirectionally arranged fibers.

7. The fiber composite material component according to claim 1, wherein at least one of the fiber bundles consists exclusively of unidirectionally arranged fibers in a direction of a run of the fiber bundles.

8. The fiber composite material component according to claim 1, wherein at least one of the fiber bundles comprises first unidirectionally arranged fibers in a direction of a run of the fiber bundles and second unidirectionally arranged fibers with which the first unidirectionally arranged fibers are interwoven.

9. The fiber composite material component according to claim 1, wherein
- at least one of the fiber bundles is arranged at an edge of the profile of the fiber composite material component,
- the fiber bundles and the bracing structures form a three-dimensional profile, and/or
- the fiber bundles are arranged such that they absorb at least one of flexural stresses, tensile stresses and compressive stresses.

10. The fiber composite material component according to claim 1, wherein
- the bracing structures comprise ribs or shear surfaces, and/or
- the bracing structures are arranged such that they transmit or absorb torsional forces or shear forces.

11. The fiber composite material component according to claim 1, wherein
- at least one of the fiber bundles has at least one exposed segment, where no bracing structure is arranged, wherein
- the at least one exposed segment is arranged at regular or irregular intervals, and/or
- the at least one exposed segment is at least partially curved or straight.

12. The fiber composite material component according to claim 1, wherein
- the bracing structures are formed from shear surfaces, and/or
- the bracing structures are formed by injecting of thermoplastic and/or thermosetting material, or by fiber bundles.

13. The fiber composite material component according to claim 1, wherein
- the fiber bundles are offset in a mold-stripping direction such that they are removable from a molding die without a pusher, and/or
- the fiber bundles include both straight regions and curved regions.

* * * * *